Figure 1:
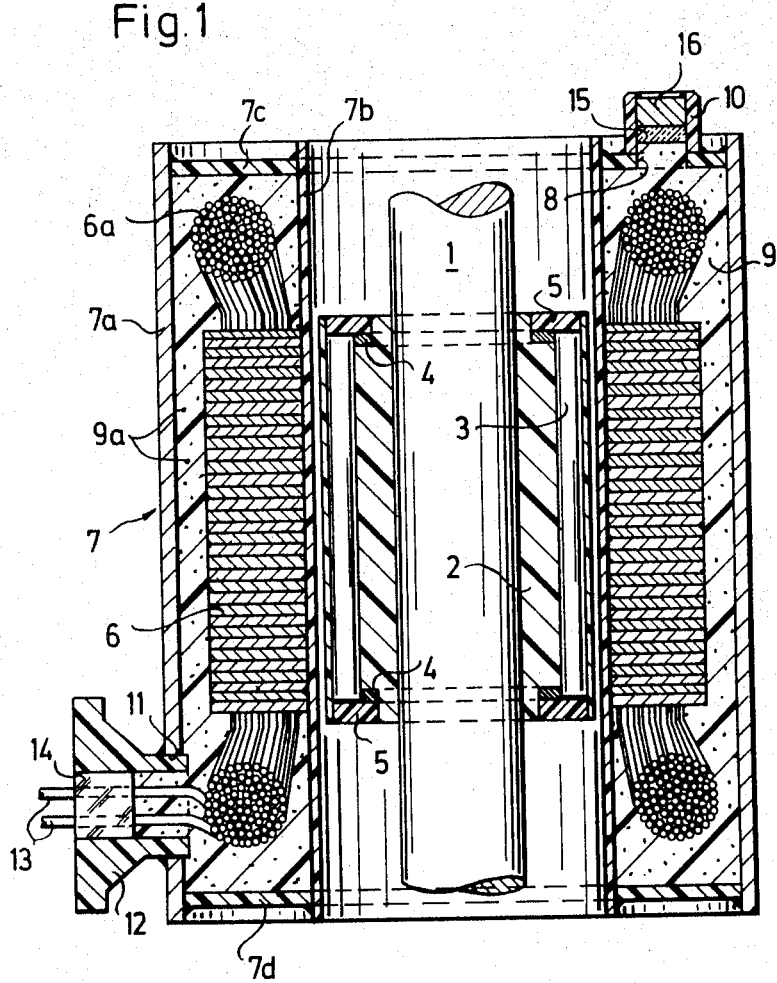

United States Patent
Zimmermann

[15] 3,638,055
[45] Jan. 25, 1972

| [54] | ELECTRICAL APPARATUS |
|---|---|
| [72] | Inventor: Urs Zimmermann, Wildberg, Switzerland |
| [73] | Assignee: Sulzer Brothers, Ltd., Winterthur, Switzerland |
| [22] | Filed: June 29, 1970 |
| [21] | Appl. No.: 50,817 |

[30] Foreign Application Priority Data

July 4, 1969 Switzerland ..................10225/69

[52] U.S. Cl. ..................310/43, 310/89, 29/596, 264/272
[51] Int. Cl. ..................................................H02k 1/04
[58] Field of Search..............310/43, 45, 89, 88, 254, 259; 29/596, 598, 605; 264/272, 202, 203

[56] References Cited

UNITED STATES PATENTS

| 3,075,250 | 5/1958 | Strohm | 264/272 |
| 3,016,580 | 1/1962 | Jaeschke | 264/272 |
| 2,961,555 | 11/1960 | Towne | 310/43 |
| 2,648,018 | 8/1953 | Meier | 310/43 |
| 3,488,837 | 1/1970 | Massouda | 310/43 |
| R24,909 | 12/1960 | Dochterman | 310/43 |
| 2,668,925 | 2/1954 | Bloser | 310/43 |

FOREIGN PATENTS OR APPLICATIONS

| 1,282,157 | 11/1968 | Germany | 310/43 |

Primary Examiner—William M. Shoop, Jr.
Assistant Examiner—R. Skudy
Attorney—Kenyon and Kenyon, Reilly, Carr & Chapin

[57] ABSTRACT

The housing for the winding is provided with at least two openings, one for the conductors for the winding and one for the pouring in of the hardenable mass. Each opening is sealed in sequence by first sealing the opening for the conductors by means of a glass plug and thereafter sealing the pour-in opening by means of a disk and plug or a seal ring and plug.

5 Claims, 3 Drawing Figures

PATENTED JAN 25 1972 3,638,055

SHEET 1 OF 2

Inventor:
URS ZIMMERMANN
BY
Kenyon & Kenyon Reilly Carr & Chapin
ATTORNEYS

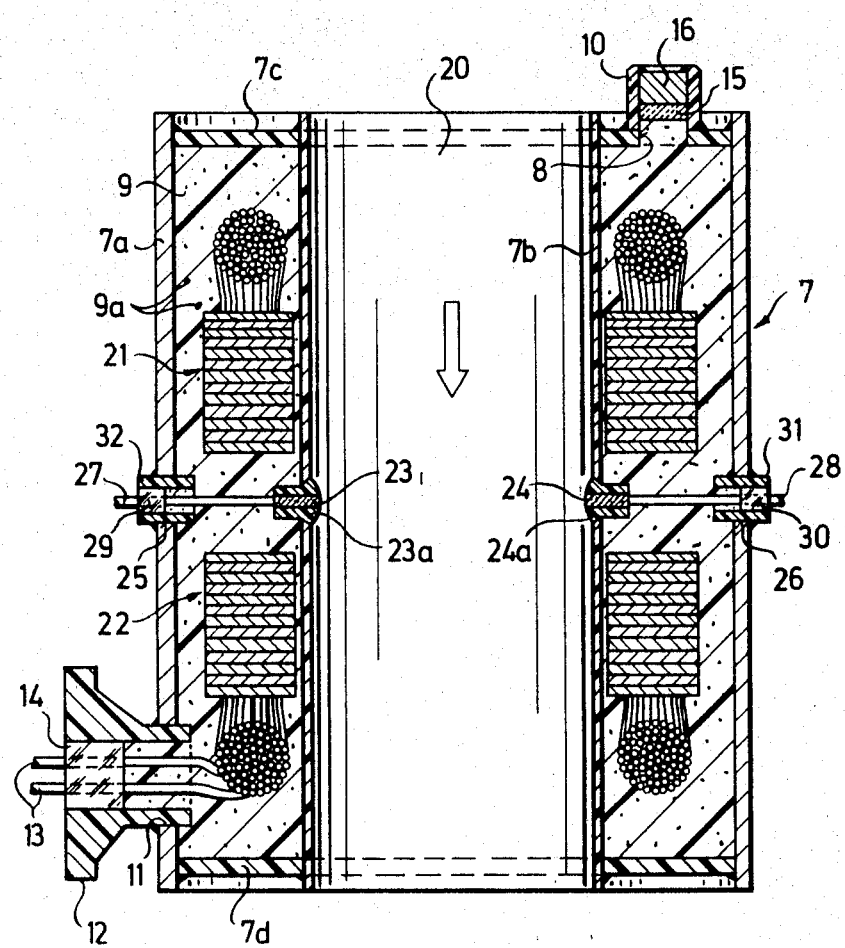

ELECTRICAL APPARATUS

This invention relates to an electrical apparatus. More particularly, this invention relates to an electrical apparatus having a sealed housing.

Electrical devices have been known in which at least one stationary electric winding has been enclosed within a housing made of corrosion-resistant material. Further, it has been known that such electrical devices have been subjected, in some instances, to high pressures, at least transiently, as well as aggressive mediums.

As an example of such electrical devices are motors for driving pumps, agitators, and the like. These motors can be made as so-called split-tube motors and both the rotor and stator can be in contact with the aggressive medium. In addition, these electrical devices can include electrical measuring apparatuses and instruments, particularly inductive quantity-meters where the medium to be measured is an aggressive electrically conductive medium.

With all such electrical devices with electrical structural parts which are subjected to high pressures, at least transiently, particularly where such pressures are greater than 1 atmosphere and especially more than 10 atmospheres and may even be of the order of magnitude of 1,000 atmospheres, it is necessary to make the constructional parts that are endangered by corrosion, and in particular the electric conductors, so that they are protected from the aggressive medium.

In the case of an electric motor, it has been known to house the stator in a housing which is made of sheet-steel and has a connector-stub through which the conductors for the stator winding pass and to pour crystal quartz sand and a thinly fluid, cold-hardening synthetic resin through the pour-in connector-stub into the housing and to thereafter harden the encapsuled stator at room temperature. However, such a construction has a disadvantage in that the pour-in connector-stub or nozzle and related seal either cannot be made gastight, or can be made gastight but at an uneconomically high cost. Further, because the formation of shrink-holes or blowholes cannot be avoided with certainty during the filling of a housing with a synthetic resin, such holes may become filled with gas or with aggressive medium from the surrounding space, and in particular through hairline cracks along the bare electrical conductors running through the seal of the pour-in stub. As a result, the same high pressure as that of the surrounding medium is built up inside such shrink-holes. Consequently, when the motor is stopped, or when disturbances occur during operation, and the pressure surrounding the stator drops to 1 atmosphere, then the shrink-holes filled with pressure medium expand, so that the stator housing, whose walls are made as thin as possible, are urged to distend. The inner wall, with which particular value is placed on thinness for the purpose of keeping electromagnetic losses low, can then become bulged out against the rotor, so that the rotor may become jammed or otherwise blocked.

Accordingly, it is an object of the invention to seal the interior of a electrical housing in a simple low cost manner.

Briefly, the invention provides an electrical apparatus which has an enclosed housing of corrosion-resistant material having at least two openings communicating the interior of the housing with the exterior. A first opening serves for the gastight passage of the conductors of a winding enclosed with the housing while a second opening serves for the pouring-in of a hardenable mass into the housing interior. In addition, gastight seal means are secured over each opening to effect a hermetically sealed housing.

In one embodiment, a stub-nozzle is placed over the second opening into the housing as by bonding or welding and a plug of noncorrosive material is bonded or welded within the stub-nozzle in gastight relation.

Since the opening for the conductors is spatially separated from the pour-in opening, a sealing or closure piece in which the electric conductors are embedded in gastight relation can be secured to the rim of the opening, for example, by bonding or welding, prior to introduction of the hardenable mass through the pour-in opening. The housing would thus be positively gastight on all sides after sealing of the pour-in opening.

The hardenable mass used can be, for example, hardenable synthetic resins such as epoxide resins whereby any shrink-holes that may form during pour-in cannot have a disturbing effect. Further, in order to increase the resistance to pressure of the solidified mass, particles of solid substances, for example quartz sand or material in the form of powder or chips can be added to the poured-in mass. Further, the hardenable mass can be of a thermoplastic substances, such as waxes, for example, polyethylene grease. As is well known, during the solidification of synthetic resins there is an occurrence of irreversible chemical structural changes, whereas thermoplastic substances have only their aggregate state altered during solidification.

If the electrical arrangement is, for example, an inductive quantity-meter, then the conductors for the measuring electrodes may be brought into the housing in a gastight manner through further openings in a manner analogous to the bringing-in of the conductors from the electric winding or windings.

Figure 2:
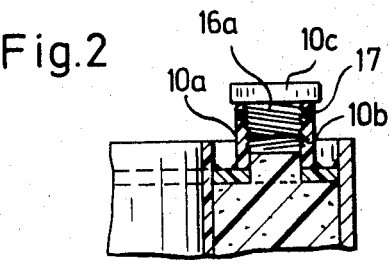

These and other objects and advantages of the invention will become more apparent from the following detailed description and appended claims taken in conjunction with the accompanying drawing in which:

FIG. 1 schematically illustrates a lengthwise sectional view through a split-tube motor made in accordance with the invention;

FIG. 2 illustrates a fragmentary view of a modified seal construction for the pour-in opening; and FIG. 3 schematically illustrates an induction quantity-meter made in accordance with the invention.

Referring to FIG. 1, a split-tube motor which may, for example, drive a pump for pumping aggressive mediums that are under high pressure, ammonium for example, has a shaft 1, with a short-circuit rotor 2. The rotor 2 has a number of copper rods 3 embedded therein which are connected at the ends by short-circuit rings 4. These rings 4 are separated from the aggressive medium by covers 5, which are bonded or welded to the rotor 2 and which consist of a corrosion-resistant nonmagnetic material. A stator 6 with a winding 6a is disposed about the rotor 2 and is enclosed by a housing 7 having cylindrical outer and inner cases 7a, 7b and covers 7c, 7d each of which is of a corrosion-resistant material. The individual parts of the housing 7 are connected in gastight relation to one another by bonding or welding. In those cases where it is possible, the connections may also be means of suitable types of seal rings. The housing may, for example, be made of sheet-steel steel or of some other material, and on occasion at least parts of the housing, particularly the inner lining, may be made of corrosion-withstanding synthetic substance that will take pressure.

The cover 7c of the housing 7 has a pour-in opening 8 for the introduction of a hardenable mass 9 into the housing 7. In addition, a stub-nozzle 10 is secured over the pour-in opening 8 in gastight relation through bonding or welding.

The outer case 7a of the housing 7 is provided with an opening 11 over which a connector 12 is secured in gastight relation as by bonding or welding. The opening 11 and the connector 12 serve for the passage of the bare electric conductors 13 to the stator winding 6a.

The assembling of the housing 7 may, for example, proceed as follows: first, the gastight passageway-connector 12 for the electric conductors 13 is bonded or welded in the opening 11 in the outer case 7a. The bare electric conductors are then inserted into holes in a glass plug 14, and the plug 14 is pushed into the connector 12. Then the plug 14 is heated until the glass melts, and the mass of glass is sealed against the conductors 13. During the following cooling period, the glass plug 14 becomes solid and the connector 12 shrinks, so that a sealed gastight connection is produced between the connector 12 and the glass plug 14. Then the stator 6 is pushed into the housing 7, and the conductors 13 are connected to the stator winding 6a. Next, the housing 7 is given the final assembly; that is, all the gastight parts are connected together.

The stab winding 6a is then impregnated with a synthetic resin as is known. Next, through the intermediary of the stub-nozzle 10 the hardenable mass 9 is poured into the housing 7. As described above, this mass may, for example, consist of an epoxy resin in a fluid state. Before being introduced into the housing 7, the mass 9 may have particles of solid substances, such for example as quartz sand or ground quartz mixed in for the purpose of increasing the strength under pressure. It is also possible in the first place to fill the housing 7, through the nozzle 10, with the solid particles 9a, and to shake the housing 7 so as to obtain uniformity of the loose material and to increase the bulk-weight, vibrating the encapsuled stator until the level of poured-in solid particles no longer sinks, and the grains of sand bear against one another; and only after this is the fluid synthetic resin mass 9 poured in. After the synthetic resin mass 9 has hardened, the pour-in opening 8 is sealed in a gastight manner from the surrounding space. To this end, the solidified mass also fills a part of the nozzle 10 and connector 11. The surface of the solidified mass in the nozzle 10 is milled smooth and a disk 15 made from an insulating material which is capable of withstanding the heat of the following bonding or welding operation is laid on the milled surface. Next, a metal corrosion-resistant plug 16 is pushed into the nozzle 10 and is bonded or welded in gastight relation thereto. The housing 7 is thus positively hermetically sealed from the surrounding space.

It should be pointed out that the solidified mass does not need to consist of a corrosion-resistant material capable of withstanding the corrosive medium, because this mass, due to the hermetic sealing does not come into contact with the aggressive medium.

It is self-evident that other gastight sealings of the pour-in opening 8 are also possible. For example, referring to FIG. 2, after completion of the pour-in and solidification processes in the nozzle 10a, into which is cut a screw-thread 10b, a closure piece 16a such as a plug is screwed into the nozzle 10a. The closure piece 16a has an upper part which ends in a cover 10c that extends over the nozzle 10a. A gastight connection is produced between the closure piece 16a and the nozzle 10a by means of a seal-ring 17 made of a corrosion-resistant material located therebetween.

Other usual gastight elements are also possible for the gastight passage of the electric conductors 13. Thus, for example, there may also be used, instead of the glass plug 14, a plug made of ceramic material. A conductor tube (not shown) may also be connected with the connector 12 in gastight manner with a desired pressure maintained therein. Such a tube can be filled, for example, with gaseous, liquid or solid protective mediums (for example, paraffin oil, paraffin grease, polyethylene grease). The protective medium is selected so as not to act corrosively on the conductors, and is moreover not attacked by the surrounding medium.

Referring to FIG. 3, wherein like reference characters as above indicate like parts an induction quantity-meter for an aggressive fluid medium is constructed so that the fluid medium flows through a channel 20 in the direction indicated by the arrow. A pair of magnetic coils 21, 22 produce in the electrically conductive liquid, for example waste water, a homogeneous field. The effect of this is that in the measurement electrodes 23, 24 offset 90° relative to the magnetic coils 21, 22 a voltage is induced that is a measurement of the throughput of the liquid. In accordance with the invention, the magnetic coils 21, 22, as well as the measurement electrodes 23, 24, are brought through the housing wall 7b in insulated fashion through measurement tubes 23a, 24a and separated, analogously to FIG. 1, from the aggressive medium by a hermetically sealed housing. That is, the outer case 7a of the housing 7 is provided with two additional openings 25, 26 for bringing the conductors 27, 28 to the measuring electrodes 23, 24. Analogously to the passage of the conductors to the magnetic coils, the bare conductors 27, 28 are each set in a glass plug 29, 30 respectively, to which stub-connectors 31, 32 are connected in sealed fashion. The gastight bringing of the electric conductors to the electric connection, and the gastight sealing of the entrance opening, are similar to the forms of construction for the corresponding places as shown in FIGS. 1 and 2.

What is claimed is:

1. An electrical apparatus comprising
    an enclosed housing of corrosion-resistant material having at least two openings communicating the interior of said housing with the exterior thereof;
    at least one stationary electric winding enclosed within said housing;
    a hardened mass about said winding within said housing;
    a plurality of conductors connected to said winding and passing through one of said openings;
    a first gastight seal means surrounding said conductors and disposed in said one opening in gastight relation, said seal means including a gastight passageway connector secured to said housing about said one opening and a glass plug mounted in said connector and having said conductors passing therethrough; and
    a second gastight seal means in gastight relation in the other of said openings.

2. An electrical apparatus as set forth in claim 1 wherein said housing includes a pair of supplementary openings and which further comprises a pair of measurement electrodes mounted in said housing, conductors connected to each electrode and passing through respective supplementary openings, and seal means disposed in gastight relation with each supplementary opening and conductor.

3. An electrical apparatus as set forth in claim 1 wherein said second gastight seal means includes a stub-nozzle secured to said housing, a disk of insulating material within said stub-nozzle in contact with said mass and a plug of corrosion-resistant material disposed in said stub-nozzle in contact with said disk and in gastight relation to said stub-nozzle.

4. An electrical apparatus as set forth in claim 1 wherein said second gastight seal means includes a stub-nozzle having an internal screw thread secured to said housing, a plug threaded into said stub-nozzle, and a seal ring between said stub-nozzle and plug in gastight relation.

5. An electrical apparatus comprising
    an enclosed housing of corrosion-resistant material having at least two openings communicating the interior of said housing with the exterior thereof;
    at least one stationary electric winding enclosed within said housing;
    a hardened mass about said winding within said housing;
    a plurality of conductors connected to said winding and passing through one of said openings;
    a first gastight seal means surrounding said conductors and disposed in said one opening in gastight relation; and
    a second gastight seal means in gastight relation in the other of said openings, said second gastight seal means including a stub-nozzle having an internal screw thread secured to said housing, a plug threaded into said stub-nozzle, and a seal ring between said stub-nozzle and plug in gastight relation.

* * * * *

UNITED STATES PATENT OFFICE
CERTIFICATE OF CORRECTION

Patent No. 3,638,055          Dated January 25, 1972

Inventor(s)          Urs Zimmermann

It is certified that error appears in the above-identified patent and that said Letters Patent are hereby corrected as shown below:

Column 3, line 1, "stab" should be --stator--

Column 3, line 1, "impregnated" should be --preimpregnated--

Signed and sealed this 15th day of August 1972.

(SEAL)
Attest:

EDWARD M. FLETCHER, JR.                    ROBERT GOTTSCHALK
Attesting Officer                          Commissioner of Patents